United States Patent [19]

Takeda

[11] Patent Number: 4,835,638
[45] Date of Patent: May 30, 1989

[54] DISK CARTRIDGE LOADING AND EJECTING MECHANISM IN RECORDING/REPRODUCING APPARATUS

[75] Inventor: Kuninobu Takeda, Furukawa, Japan
[73] Assignee: Alps Electric Co., Ltd., Japan
[21] Appl. No.: 127,529
[22] Filed: Dec. 1, 1987

Related U.S. Application Data

[63] Continuation of Ser. No. 708,696, Mar. 6, 1985, abandoned.

[30] Foreign Application Priority Data

Mar. 6, 1984 [JP] Japan ............................ 59-31222[U]

[51] Int. Cl.⁴ ...................... G11B 5/016; G11B 5/012; G11B 23/03
[52] U.S. Cl. .............................. 360/99.02; 360/99.06; 360/97.04; 360/133
[58] Field of Search ...................... 360/97–99, 360/133, 96.1–96.6, 105

[56] References Cited

U.S. PATENT DOCUMENTS

| | | | |
|---|---|---|---|
| 3,940,147 | 2/1976 | Hunt et al. | 360/97 |
| 4,466,032 | 8/1984 | Saito | 360/99 X |
| 4,546,397 | 10/1985 | Asami et al. | 360/133 |
| 4,573,093 | 2/1986 | Obama et al. | 360/133 |
| 4,577,246 | 3/1986 | Matsuki | 360/96.5 X |
| 4,587,585 | 5/1986 | Shimaaka et al. | 360/97 X |
| 4,604,666 | 8/1986 | Kitahara et al. | 360/99 |
| 4,633,348 | 12/1986 | Takai | 360/96.5 |
| 4,638,386 | 1/1987 | Takamatsu | 360/96.6 |
| 4,651,240 | 3/1987 | Okita et al. | 360/97 X |
| 4,661,868 | 4/1987 | Tezuka | 360/96.6 X |
| 4,679,106 | 7/1987 | Okita et al. | 360/133 |
| 4,723,185 | 2/1988 | Maeda | 360/97 X |
| 4,724,497 | 2/1988 | Takeda et al. | 360/97 X |
| 4,734,801 | 3/1988 | Takeda et al. | 360/97 X |

FOREIGN PATENT DOCUMENTS

| | | | |
|---|---|---|---|
| 0082505 | 6/1983 | European Pat. Off. | 360/97 |
| 0157588 | 10/1985 | European Pat. Off. | 360/99 |
| 58-102361 | 6/1983 | Japan | 360/133 |
| 58-97166 | 6/1983 | Japan | 360/133 |
| 58-171771 | 10/1983 | Japan | 360/99 |

Primary Examiner—Stuart N. Hecker
Assistant Examiner—Alfonso Garcia
Attorney, Agent, or Firm—Guy W. Shoup; Paul J. Winter; Norman R. Klivans

[57] ABSTRACT

A disk cartridge loading and ejecting mechanism for a recording/reproducing apparatus has: a cartridge holder for receiving a disk cartridge which is movable between a cartridge loading position and a cartridge ejecting position; a loading lever for moving the cartridge holder to the cartridge loading position; a protrusion provided at a side portion of the loading lever and moved integrally with the loading lever; a lock lever having an engagement portion with which the loading lever engages and an abutting portion on which a forward end of the disk cartridge is able to abut and for locking the loading lever in the ejecting position and the loading position; a sliding plate having a first and a second slanting cam portion with which the protrusion is engageable and being movable in the direction along which the disk cartridge is inserted and discharged; an ejection operation section connected to the sliding plate for moving the sliding plate in the disk cartridge insertion direction; and an elastic member for urging the sliding plate toward the ejection operation section.

1 Claim, 3 Drawing Sheets

4,835,638

DISK CARTRIDGE LOADING AND EJECTING MECHANISM IN RECORDING/REPRODUCING APPARATUS

This is a continuation application from application Ser. No. 708,696 filed Mar. 6, 1985, now abandoned.

This application is related to co-pending U.S. application Ser. No. 626,316.

BACKGROUND OF THE INVENTION

The present invention generally relates to an apparatus for recording and/or reproducing a disk cartridge such as a magnetic disk cartridge and more particularly to a disk cartridge recording/reproducing apparatus having an improved cartridge ejecting mechanism.

In the conventional disk cartridge recording/reproducing apparatus, there is a disadvantage that the cartridge loading/ejecting mechanism is complicated with a large numbers of parts.

SUMMARY OF THE INVENTION

An object of the invention is to provide a disk cartridge recording/reproducing apparatus in which the disk cartridge loading and ejecting operations can be realized with a small number of parts.

To attain the object the disk cartridge recording/reproducing apparatus according to the present invention is featured in that the apparatus comprises a cartridge holder for receiving therein a disk cartridge and being movable between a cartridge loading position and a cartridge ejecting position; a loading lever for moving the cartridge holder to the cartridge loading position; a protrusion provided at a side portion of the loading lever and moved integrally with the loading lever; a lock lever having an engagement portion with which the loading lever engages and an abutting portion on which a forward end of the disk cartridge is able to abut and for locking the loading lever in the ejecting position and the loading position; a sliding plate having a first and a second slanting cam portion with which the protrusion is engageable and being movable in the direction along which the disk cartridge is inserted and discharged; an ejection operation section connected to the sliding plate for moving the sliding plate in the disk cartridge insertion direction; and an elastic member for urging the sliding plate toward the ejection operation section.

Other features and advantages of the present invention will be apparent when read the following description in conjunction with the accompanying drawings.

BRIEF DESCRIPTION OF THE DRAWINGS

FIGS. 1 to 4 are explanatory diagrams showing an embodiment of the present invention, wherein:

FIG. 1 is a plan view showing the recording/reproducing apparatus in a state before mounting a magnetic disk cartridge and the main of the magnetic disk cartridge;

FIG. 2 is a plan view of the recording/reproducing apparatus in a state after mounting the magnetic disk cartridge;

FIG. 3 is a side view of the substantial portion of the recording/reproducing apparatus in the process of mounting the magnetic disk cartridge;

FIG. 4 is a side view of the substantial portion of the recording/reproducing apparatus after mounting the magnetic disk cartridge.

DETAILED DESCRIPTION OF PREFERRED EMBODIMENT

Figure 1:
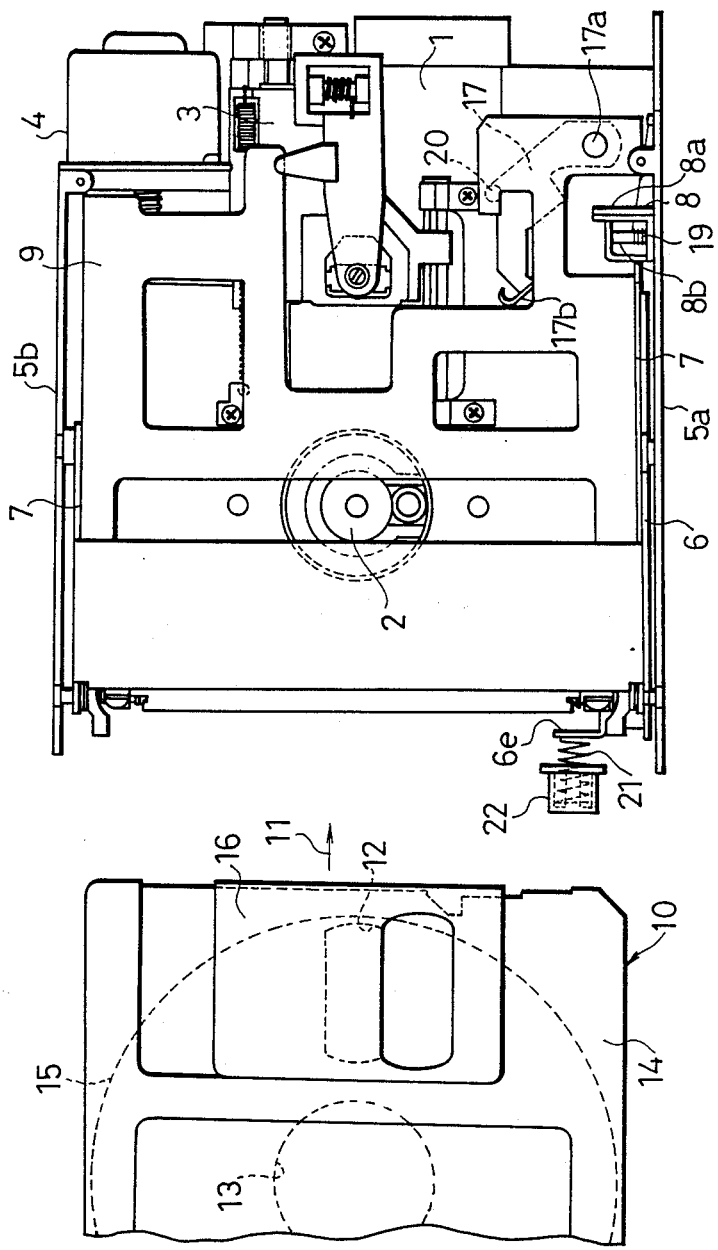

Referring to FIG. 1, first, the outline of the arrangement of the recording/reproducing apparatus and the magnetic disk cartridge will be described.

A disk rotation shaft 2 a carriage 3 mounting thereon a magnetic head and a pad, and a stepping motor 4 for moving the carriage are respectively disposed on a frame at predetermined positions respectively. Side plates 5a and 5b are respectively attached on opposite sides of the frame 1. A cartridge holder 9 is disposed inside these plates through a slide plate 6, a loading lever 7 and a lock lever 8 and is faced to the disk rotation shaft 2. A cartridge insertion opening (not shown) is formed in the left end, in the drawing, of the cartridge holder 9 so that a magnetic disk cartridge 10 is inserted toward the carriage 3 as shown with an arrow 11.

The magnetic disk cartridge 10 is constituted by a casing 14 which is moulded with a hard synthetic resin and which is formed with a magnetic head insertion opening 12 and a rotation shaft insertion opening 13 in predetermined positions, a magnetic disk 15 rotatably accommodated within the casing 14, and a shutter 16 covering the magnetic head insertion opening 12 of the casing 14. Among the side plates 5a, 5b and the carriage 3, disposed is a swing lever 17 for opening the shutter 16 of the magnetic disk cartridge 10 inserted in the cartridge holder 9. The swing lever 17 is mounted on the cartridge holder 9 such that it is rotated about a fulcrum 17a and urged by a not shown spring in the counterclockwise direction.

Figure 3:
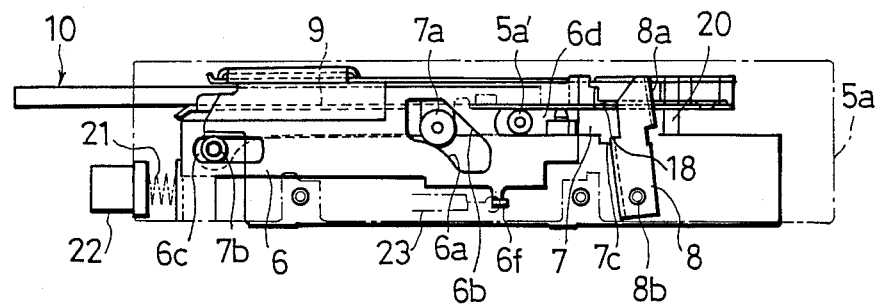
Figure 4:
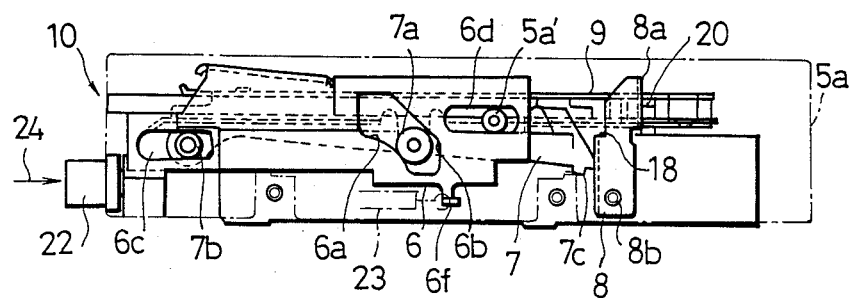

As shown in FIGS. 3 and 4, a protrusion such as a roller 7a is disposed on the loading lever 7 at the opposite side to the side plate 5a, and a step portion 7c is formed on the loading lever 7 at the end portion in opposition to the loading lever 7. The loading lever 7 is arranged to be swingable about a fulcrum 7b. The above-mentioned cartridge holder 9 is swingably connected to the loading lever 7 at the position of the roller 7a. For example, the cartridge holder 9 is fixedly provided with a shaft which is inserted through a hole formed in the loading lever 7, and roller 7a is mounted one the shaft. Thus, the roller 7a is movable integrally with the loading lever 7. The lock lever 8 has an engaging portion 18 with which the step portion 7c of the loading lever 7 engages and an abutting portion 8a which is formed at an upper end portion thereof and with which the forward end of the magnetic disk cartridge 10 is able to come into contact. The lock lever 8 is urged by a spring 19 shown in FIG. 1 to rotate about the fulcrum 8b in the counterclockwise direction in FIGS. 3 and 4. A lock pin 20 is fixed on a frame 1 for restricting the swing of the swing lever 17 and is fixed on the frame 1.

The slide plate 6 is movable in the loading direction of the magnetic disk cartridge 10 and has a first slanting cam portion 6a, a second slanting cam portion 6b, a side hole 6c, a side hole 6d, an expansion portion 6e, and a protrusion 6f. The cam portions 6a and 6b are arranged to be engagable with the roller 7a mounted on the loading lever 7. The side hole 6c allows and guides the fulcrum 7b to perform its relative movement, and the side hole 6d allows and guides a guide roller 5a' provided on the side plate 5a to perform its relative movement. The expansion portion 6e is formed on the side of the cartridge insertion opening of the cartridge holder 9 as shown in FIG. 1. The protrusion 6f is vertically downwardly extended in the vicinity of the first and second cam portions 6a and 6b.

Reference numeral 21 designates a spring with its one end engaged with the expansion portion 6e of the slide plate 6 and the other end mounted in an air gap portion formed in an ejecting button 22 as shown FIG. 1. The spring 21 and the ejecting button 22 constitute an ejection operation section for moving the slide plate 6 in the insertion direction of the magnetic disk cartridge 10, that is, in the direction of an arrow 11 as shown FIG. 1.

Reference numeral 23 shown in FIGS. 3 and 4 designates an elastic member such as a spring for urging the slide plate 6 toward the ejecting button 22, with its one end engaged with the protrusion 6f of the slide plate 6 and the other end engaged, for example, with the side plate 5a.

The operation of the embodiment will be now described.

First, operations will be explained before the magnetic disk cartridge 10 has been loaded in a predetermined position in the recording/reproducing apparatus.

Referring to FIG. 3, before the magnetic disk cartridge 10 has been loaded in the predetermined position, the sliding plate 6 is disposed apart from the ejecting button 22 against the force of the spring 23 and the fulcrum 7b of the loading lever 7 is disposed relatively left the side hole 6c of the sliding plate 6 and the roller 7a engages with the first cam portion 6a to be disposed in its upper position. The step portion 7c of the loading lever 7 engages with the engaging portion 18 of the lock lever 8 and the cartridge holder 9 connected with the loading lever 7 is disposed in its upper position to allow the magnetic disk cartridge 10 to be inserted. At this time, the swing lever 17 shown in FIG. 1 is disposed in its upper position together with the cartridge holder 9 and it does not engage with the lock pin 20.

In the above-mentioned state, when the magnetic disk cartridge 10 is inserted and pressed into the cartridge holder 9, the top end portion of the magnetic disk cartridge 10 reaches the abutting portion 8a of the lock lever 8, so that the lock lever 8 is swung clockwise in FIG. 3 against the force of the spring 19 shown in FIG. 1. Thus, the engagement between the step portion 7c of the loading lever 7 and the engaging portion 18 of the lock lever 8 is released, that is the force holding the sliding plate 6 in the position shown in FIG. 3 is released, so that the sliding plate 6 is moved toward the ejecting button 22 by the force of the spring 23. Then, the roller 7a engages with the second cam portion 6b of the sliding plate 6 and is guided downward so that the loading lever 7 is swung clockwise in FIG. 3 about the fulcrum 7b and the cartridge holder 9 moves downward as the loading lever 7 swings.

During the above-mentioned operation, that is upon inserting the magnetic disk cartridge 10 into the cartridge holder 9, the forward end portion 17b of the swing lever 17 shown in FIG. 1 abuts on the edge end of the shutter 16 of the magnetic cartridge 10. When the magnetic disk cartridge 10 is inserted into the cartridge holder 9, the swing lever 17 is swung counterclockwise in FIG. 2 against the force of the not-shown spring and the shutter 16 is opened by the forward end portion 17b of the swing lever 17 so that the insertion opening 12 of the magnetic head is exposed. Upon completion of the above-mentioned operation, the swing lever 17 moves down integrally with the cartridge holder 9 and engages with the lock pin 20, so that the swing of the swing lever 17 is restricted. The forward end portion of the loading lever 7 is engaged and stopped by the side portion of the lock lever 8, so that the movement of the loading lever 7 is restricted.

Figure 2:
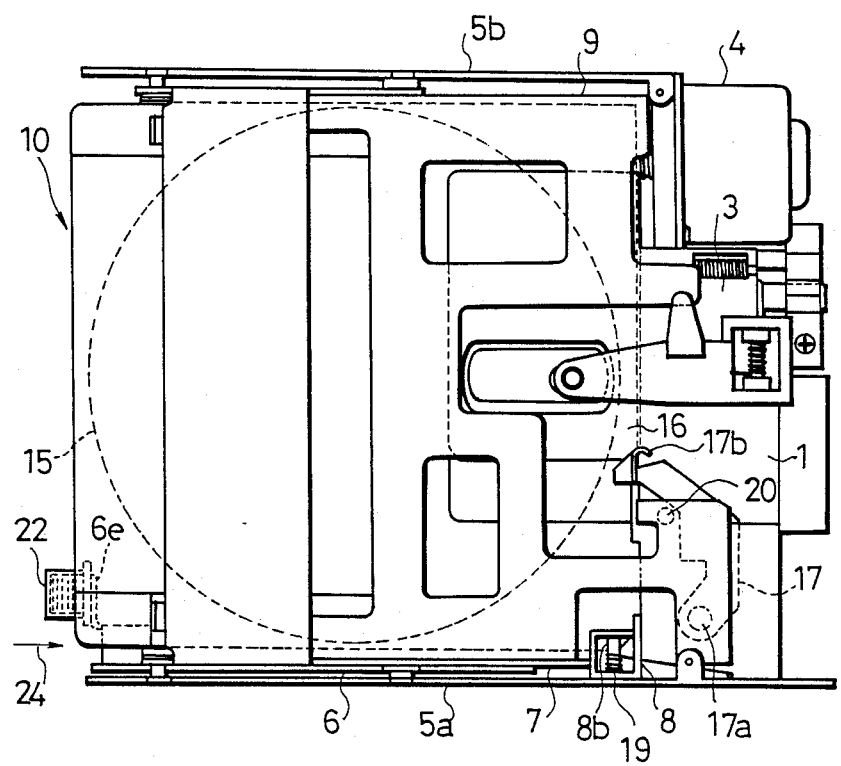

Thus, the state has been as shown in FIGS. 2 and 4, in which the magnetic disk 15 of the magnetic disk cartridge 10 is placed right the loading lever in order that the magnetic head faces the magnetic head insertion opening 12 to enable the recording/reproducing operation to be performed. The operation for recording/reproducing will not be described here.

Next, the operation for ejecting the magnetic disk cartridge 10 will be explained hereinunder.

When the ejecting button 22 is pressed in the direction of arrow 24 in the state as shown in FIGS. 2 and 4, the slide plate 6 is moved through the expansion portion 6e in the direction of inserting the magnetic disc cartridge 10, that is, rightward in the drawing, against the force of the spring 23.

Accordingly, the first cam portion 6a of the sliding plate 6 and the roller 7a engage with each other, the roller 7a guided by the first cam portion 6a is moved up in FIG. 4, the roller 7a and the loading lever 7 rotate integrally with each other in the counterclockwise direction in FIG. 4, and the cartridge holder 9 moves up in response with the rotation of the load lever 7. At the same moment, the lock lever 8 is rotated in counterclockwise direction in FIG. 4 by the force of the spring 19 shown in FIG. 2, and the step portion 7c of the loading lever 7 and the engaging portion 18 of the lock lever 8 engage with each other.

The swing lever 17 is swung in counterclockwise direction in FIG. 2 by the force of the not-shown spring. The shutter 16 of the magnetic disk cartridge 10 is closed by the rotation of the swing lever 17, and, at the same moment, the magnetic disk cartridge 10 is discharged smoothly through the not-shown cartridge insertion opening of the cartridge holder 9. In this way, the ejecting operation is performed smoothly.

In the above-mentioned embodiment, the roller 7 is provided with the roller 7a as a protrusion which engages with the first and second cam portions 6a and 6b of the sliding plate 6. The present invention is not, however, limited to the provision of such a roller 7a as the protrusion, but, alternatively, a pillar may be fixed onto the loading lever 7 or the cartridge holder 9, as the protrusion, in place of the roller 7a.

In the above-mentioned embodiment, the ejecting operation section is constituted by the spring 21 connected with the sliding plate 6 and the ejecting button 22. However, this present invention is not limited to the embodiment, but the ejecting button 22 may be connected with the sliding plate 6 through a rod member without providing the spring 21, or, alternatively, a lever or the like may be provided in place of the ejecting button 22.

As described above, the disk cartridge recording/reproducing apparatus according to the present invention is arranged such that the protrusion disposed at the side portion of the loading lever is caused to engage with the first and second slanting cam portions formed in the sliding plate so that the loading lever and the cartridge holder in which the disk cartridge is received are displaced to the loading/ejecting position through the first and second cam portions and the protrusion in response to the moving operation of the sliding plate. Accordingly, the disk cartridge loading/ejecting operations can be realized with a small number of parts, resulting in an advantage that the arrangement is simplified and the manufacturing cost is reduced.

What is claimed is:

1. A loading and ejecting mechanism for a disk cartridge in a recording and reproducing apparatus, comprising:

a frame having a front side for inserting a disk cartridge therein in a rear longitudinal direction toward a rear side of said frame;

a cartridge holder within said frame for receiving at a first position a disk cartridge inserted in said front side of said frame, and being movable downwardly from said first position to a second position in said frame wherein said disk cartridge is loaded for recording and reproducing, and from said second position back to said first position wherein said disk cartridge can be ejected from said frame;

a loading lever within said frame having a front end pivotably mounted to the frame and a rear end swingable upwardly and downwardly, said loading lever being coupled to said cartridge holder for moving said cartridge holder to said first position when said rear end is swung to said upward position, and said cartridge holder to said second position when said rear end is swung to the downward position;

a lock lever within said frame having an engagement portion which engages said loading lever at a lock position to lock said loading lever in said upward position, and an abutting portion which is abutted by said disk cartridge inserted in said cartridge holder to displace said engagement portion of said lock lever from said lock position so as to release said loading lever to move from said upward position to said downward position;

first biasing means for biasing said engagement portion toward said lock position;

a roller provided on one side of said loading lever which is moved upward and downward with said rear end of said loading lever;

a sliding plate slidable in front and rear longitudinal directions of said frame along said one side of said loading lever and having first and second slanting cam portions engagable with said roller, wherein said roller on said loading lever is engaged with said first slanting cam portion as said sliding plate is moved in the front longitudinal direction of said frame for moving said rear end of said loading lever to said downward position, when said rear end thereof is released from said lock lever, in order to move said cartridge holder to said second position for loading said disk cartridge, and said roller is engaged with said second slanting cam portion for moving said rear end of said loading lever to said upward position when said sliding plate is moved in the rear longitudinal direction of said frame, in order to move said cartridge holder to said first position for ejecting said disk cartridge;

second biasing means for biasing said sliding plate toward the front longitudinal direction; and an ejection operation portion connected to said sliding plate for moving said sliding plate in said rear longitudinal direction against the force of said second biasing means for moving said rear end of said loading lever to said upward position, moving said cartridge holder to said first position, and ejecting said disk cartridge, wherein said ejection operation portion comprises an ejecting button and a spring provided between said sliding plate and said button.

* * * * *